US006203030B1

(12) United States Patent
Storms

(10) Patent No.: US 6,203,030 B1
(45) Date of Patent: Mar. 20, 2001

(54) TRACTOR STAND

(76) Inventor: Leo Storms, HCR 59, Box 4, Winner, SD (US) 57580-7801

(*) Notice: Subject to any disclaimer, the term of this patent is extended or adjusted under 35 U.S.C. 154(b) by 0 days.

(21) Appl. No.: 09/164,650

(22) Filed: Oct. 1, 1998

(51) Int. Cl.⁷ .................................................. B62D 61/12
(52) U.S. Cl. ............................ 280/35; 280/475; 254/418
(58) Field of Search .......................... 280/47.131, 47.15, 280/47.21, 47.24, 79.11, 79.3, 475, 35; 254/2 B, 3 B, 3 R, 4 B, 8 B, 7 B, 418, 426; 269/17

(56) References Cited

U.S. PATENT DOCUMENTS

| | | | | |
|---|---|---|---|---|
| 1,336,037 | * | 4/1920 | LaGrange | 254/8 B |
| 1,611,366 | * | 12/1926 | Peterson et al. | 254/7 B |
| 2,417,727 | * | 3/1947 | Batlle | 280/47.24 |
| 2,590,361 | * | 3/1952 | Arnold | 254/418 |
| 3,904,224 | * | 9/1975 | Belke | 280/485 |
| 4,136,909 | * | 1/1979 | Duttarer | 280/475 |
| 4,779,888 | * | 10/1988 | Raymond | 280/475 |
| 4,799,656 | * | 1/1989 | Puskarich | 269/17 |
| 5,575,492 | * | 11/1996 | Stone | 280/475 |

FOREIGN PATENT DOCUMENTS

| | | | | |
|---|---|---|---|---|
| 14915 | * | 10/1933 | (AU) | 280/475 |
| 144436 | * | 3/1950 | (AU) | 280/475 |
| 339864 | * | 9/1959 | (CH) | 280/47.24 |

\* cited by examiner

*Primary Examiner*—Frank Vanaman

(57) ABSTRACT

A tractor stand for supporting a front end of a tractor when the tractor is split for repairs or maintenance includes a pair of wheel assemblies, each wheel assembly has a pair of arms and an axle. One of the arms attaches to the frame of the tractor and the second arm includes an means for adjustably securing the second arm to the tractor such that the weight of the tractor is supported by the wheel assemblies. Each axle is inserted into a connecting bar. In a most preferred embodiment, an adjustable chain assembly extends from one of the arms of each wheel assembly for securing the wheel assembly to the front axle of the tractor.

17 Claims, 4 Drawing Sheets

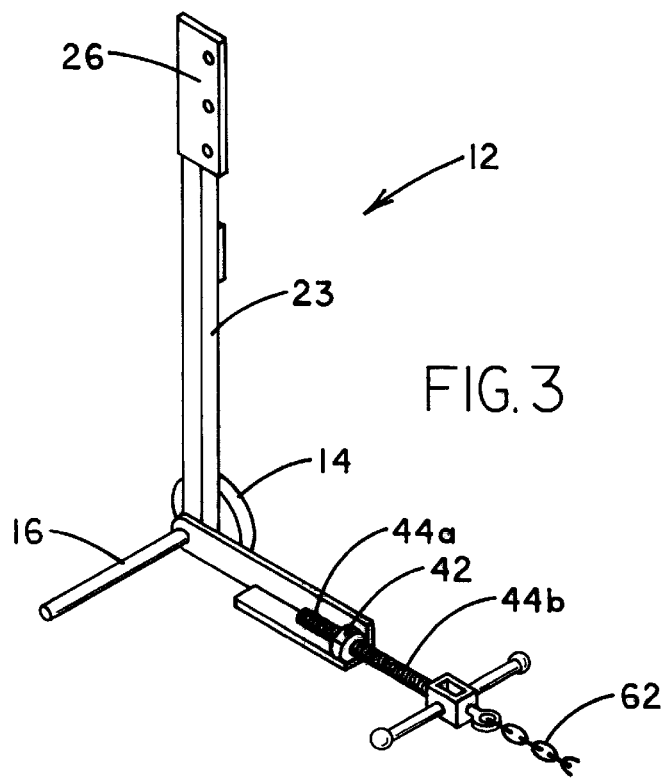
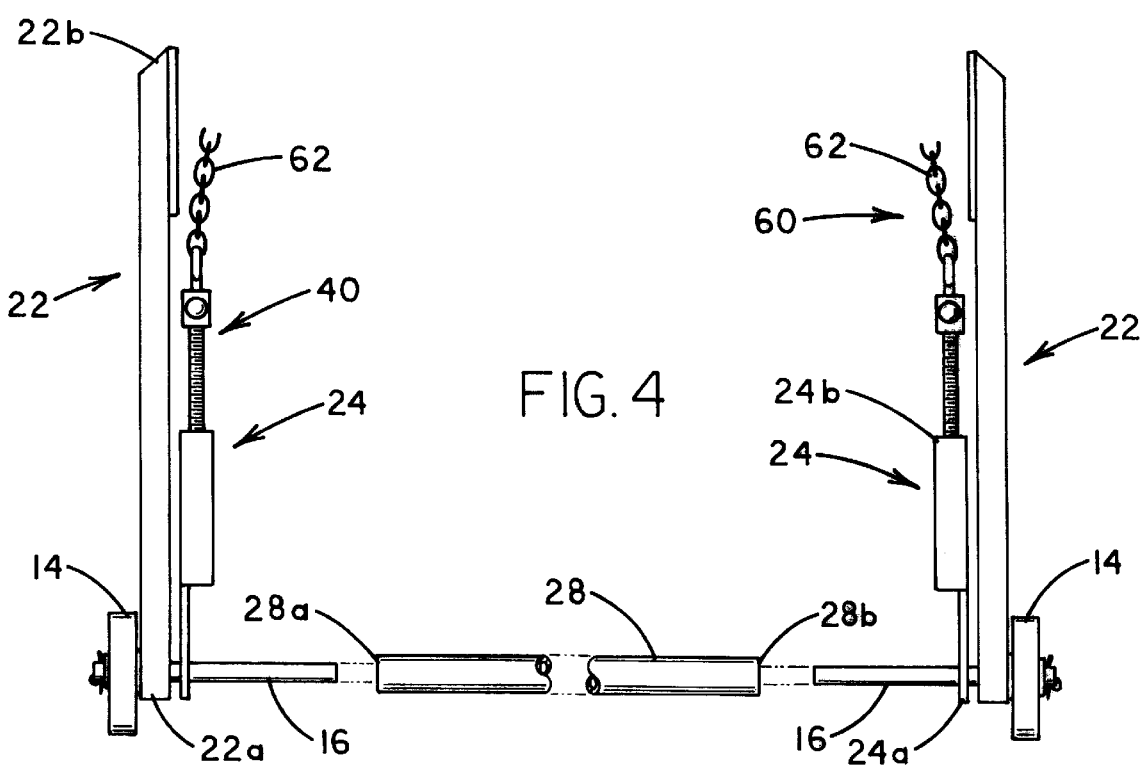

TRACTOR STAND

BACKGROUND OF THE INVENTION

1. Field of the Invention

The present invention relates to tractor stands and splitters and more particularly pertains to a new tractor stand for supporting a front end of a tractor when the tractor is split for repairs or maintenance.

2. Description of the Prior Art

The use of tractor stands and splitters is known in the prior art. More specifically, tractor stands and splitters heretofore devised and utilized are known to consist basically of familiar, expected and obvious structural configurations, notwithstanding the myriad of designs encompassed by the crowded prior art which have been developed for the fulfillment of countless objectives and requirements.

Known prior art tractor stands and splitters include U.S. Pat. No. 3,850,419; U.S. Pat. No. 5,152,505; U.S. Pat. No. 1,611,366; U.S. Pat. No. 4,799,656; U.S. Pat. No. 5,620,192; U.S. Pat. No. 4,793,592; U.S. Pat. No. 3,949,976; U.S. Pat. No. 5,505,425; U.S. Pat. No. 4,784,402; U.S. Pat. No. 4,848,717; and U.S. Pat. No. Des. 349,993.

While these devices fulfill their respective, particular objectives and requirements, the aforementioned patents do not disclose a new tractor stand. The inventive device includes a pair of wheeled arms for coupling to the frame of a tractor, each arm having an adjustable chain for securing the wheels in position to support the front of a tractor when the tractor is split.

In these respects, the tractor stand according to the present invention substantially departs from the conventional concepts and designs of the prior art, and in so doing provides an apparatus primarily developed for the purpose of supporting a front end of a tractor when the tractor is split for repairs or maintenance.

SUMMARY OF THE INVENTION

In view of the foregoing disadvantages inherent in the known types of tractor stands and splitters now present in the prior art, the present invention provides a new tractor stand construction wherein the same can be utilized for supporting a front end of a tractor when the tractor is split for repairs or maintenance.

The general purpose of the present invention, which will be described subsequently in greater detail, is to provide a new tractor stand apparatus and method which has many of the advantages of the tractor stands and splitters mentioned heretofore and many novel features that result in a new tractor stand which is not anticipated, rendered obvious, suggested, or even implied by any of the prior art tractor stands and splitters, either alone or in any combination thereof.

To attain this, the present invention generally comprises a pair of wheeled arms for coupling to the frame of a tractor, each arm having an adjustable chain for securing the wheels in position to support the front of a tractor when the tractor is split.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new tractor stand apparatus and method which has many of the advantages of the tractor stands and splitters mentioned heretofore and many novel features that result in a new tractor stand which is not anticipated, rendered obvious, suggested, or even implied by any of the prior art tractor stands and splitters, either alone or in any combination thereof.

It is another object of the present invention to provide a new tractor stand which may be easily and efficiently manufactured and marketed.

It is a further object of the present invention to provide a new tractor stand which is of a durable and reliable construction.

An even further object of the present invention is to provide a new tractor stand which is susceptible of a low cost of manufacture with regard to both materials and labor, and which accordingly is then susceptible of low prices of sale to the consuming public, thereby making such tractor stand economically available to the buying public.

Still yet another object of the present invention is to provide a new tractor stand which provides in the apparatuses and methods of the prior art some of the advantages thereof, while simultaneously overcoming some of the disadvantages normally associated therewith.

Still another object of the present invention is to provide a new tractor stand for supporting a front end of a tractor when the tractor is split for repairs or maintenance.

Yet another object of the present invention is to provide a new tractor stand which includes a pair of wheel assemblies, each wheel assembly having a pair of arms attachable to the front end of a tractor and an axle for aligning the stand assemblies by insertion into a connecting bar.

Still yet another object of the present invention is to provide a new tractor stand that is easily and quickly attached to a tractor for splitting and holds the front of the tractor safely.

Even still another object of the present invention is to provide a new tractor stand that provides stable and firm attachment to the tractor using existing holes in the tractor.

yet another object of the present invention is to provide a flexible device capable of being manipulated to accommodate multiple brands and variations of tractors.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a perspective view of a second stand assembly for positioning opposite the stand assembly of FIG. 2.

FIG. 4 is a front view of the present invention.

DESCRIPTION OF THE PREFERRED EMBODIMENT

Figure 1:
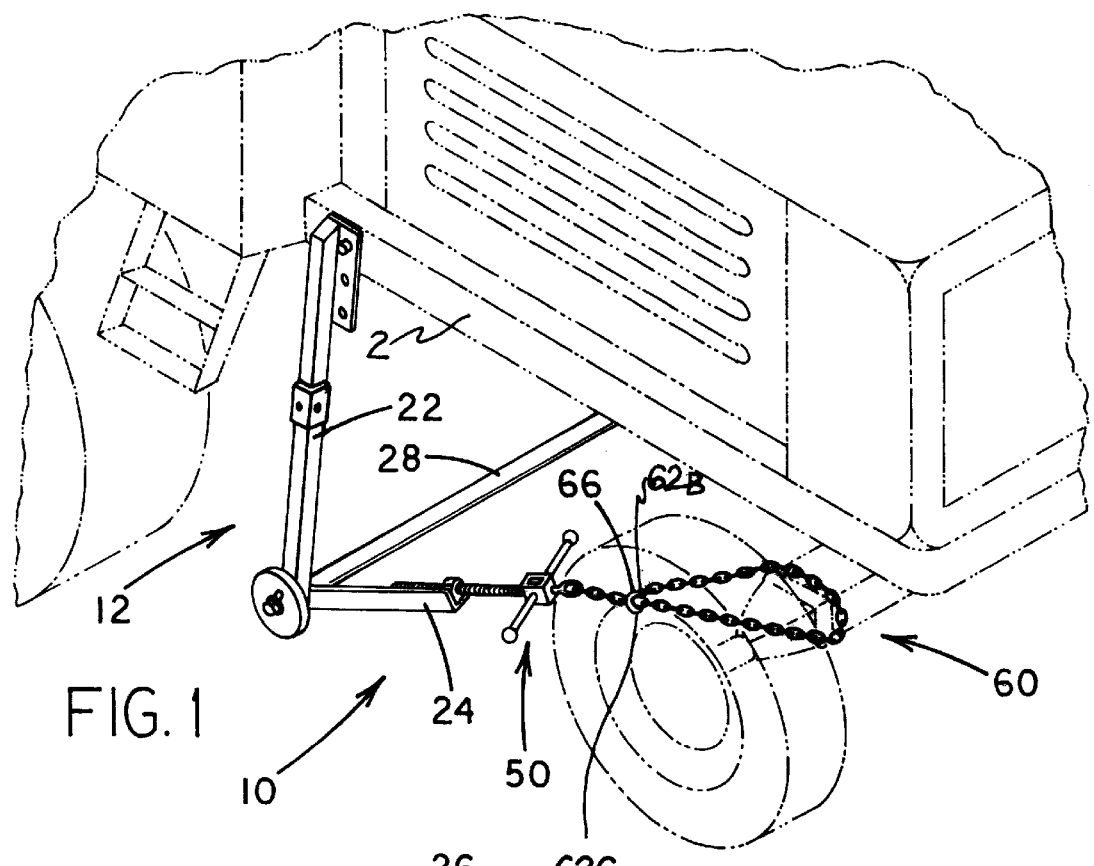
FIG. 1 is a perspective view of a tractor stand according to the present invention.
Figure 2:
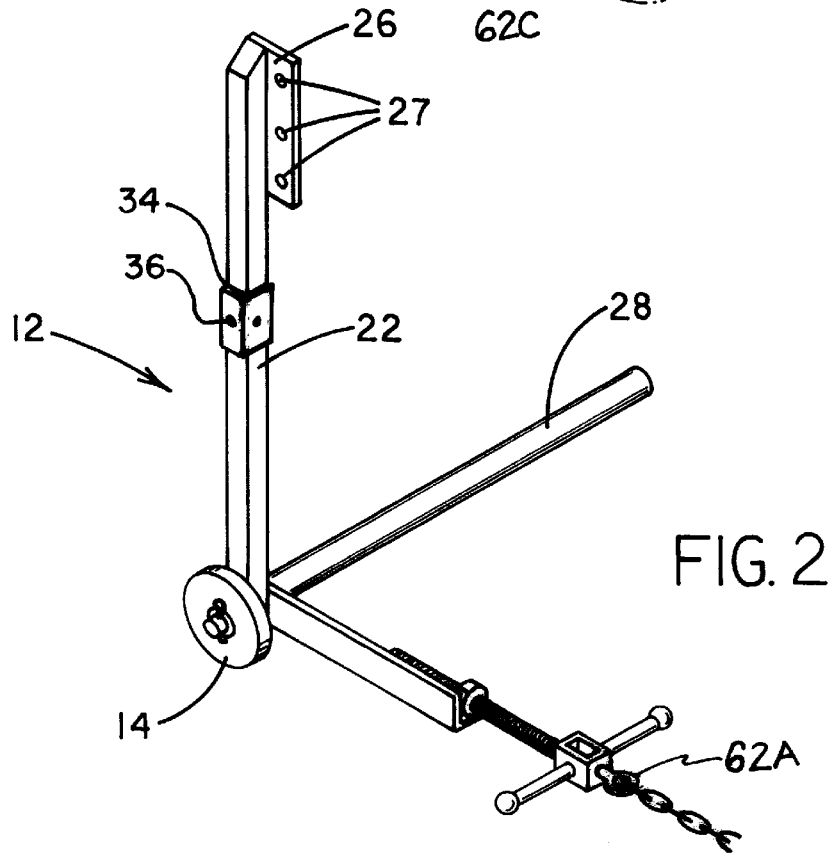
FIG. 2 is a perspective view of a stand assembly for one side of a tractor.
Figure 5:
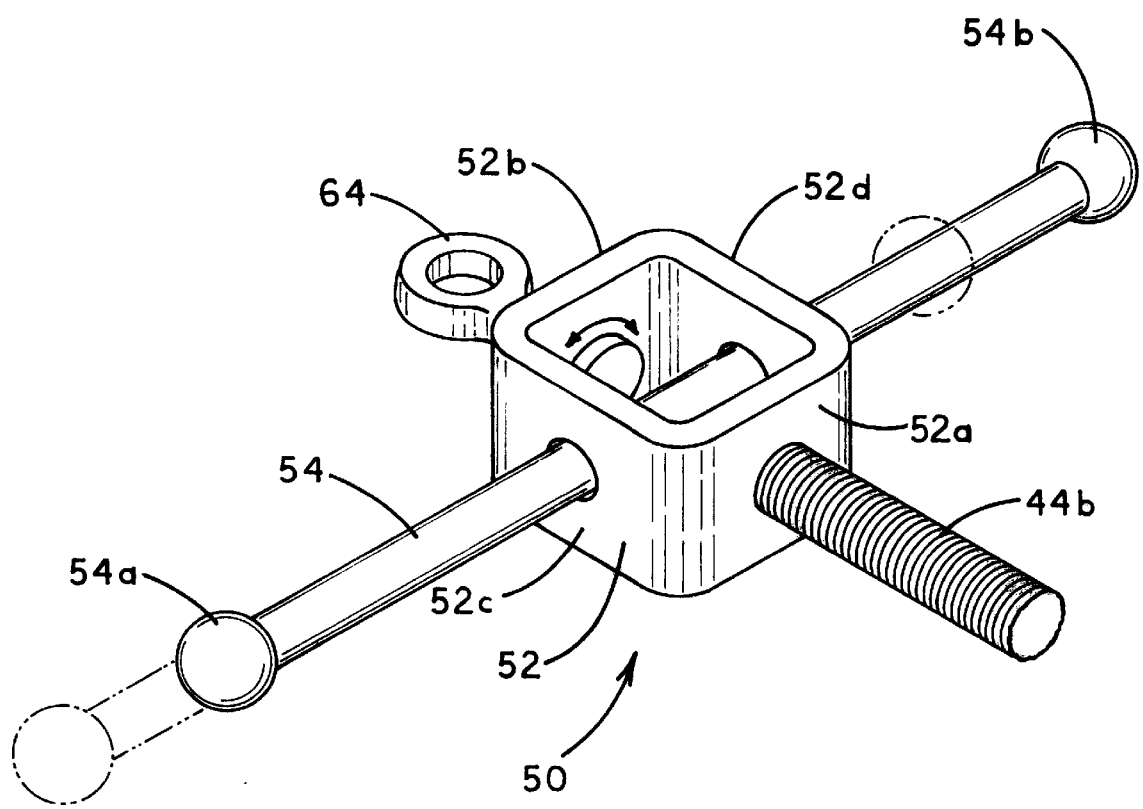
FIG. 5 is a perspective view of the handle assembly.

With reference now to the drawings, and in particular to FIGS. 1 through 5 thereof, a new tractor stand embodying the principles and concepts of the present invention and generally designated by the reference numeral 10 will be described.

As best illustrated in FIGS. 1 through 5, the tractor stand 10 comprises a pair of stand assemblies 12 positionable on opposite side of a tractor 2. Each stand assembly 12 includes a wheel 14 and an axle 16 extending outwardly from a center of the wheel 14. A first arm 22 is pivotally coupled to the axle 16 at a first end of the first arm 22A. The first arm is pivotally couplable to the tractor at a second end of the first arm 22B. The first arm 22 preferably has a length such that the first arm 22 extends towards a rear of the tractor 2 at an angle between 10 and 40 degrees when the first arm 22 is coupled to the tractor and the wheel 14 rests on the ground. However, it is most preferred that the angle is between 15 and 30 degrees. A second arm 24 is pivotally coupled to the axle 16 at a first end 24A of the second arm 24. Each stand assembly 12 also includes an adjustable tension means 40 designed for coupling a second end 24B of the second arm 24 to a front portion of the tractor 2.

Each axle 16 is insertable into opposite ends 28A and 28B of a connecting bar 28 such that the wheels 14 are substantially aligned.

The tension means includes a threaded collar 42 coupled to the second end 24B of the second arm 24. A first end 44A of a threaded bar 44 is extended through the threaded collar 42 such that the threads of the threaded bar 44 engage the threads of the threaded collar 42. A handle assembly 50 for facilitating rotation of the threaded bar 44 is fixedly attached to a second end 44B of the threaded bar 44 for rotating the threaded bar 44 such that a distance between the second end 44B and the threaded collar 42 is adjustable by rotating the threaded bar 44.

A tractor engagement means 60 designed for coupling to a front portion of the tractor is coupled the handle assembly 50. The tractor engagement means 60 is most preferably a chain 62 having a first end 62A coupled to a loop member 64. The loop member 64 is coupled to the handle assembly 50 such that the loop member 64 can rotate freely with respect to the handle assembly 50 such that the chain 62 is not twisted when the handle assembly 50 is rotated.

The chain includes a hook 66 coupled to a second end 62B of the chain 62 for engaging a selectable link 62C of the chain 62 such that the chain 62 forms a loop around a front portion of the tractor 2. Thus the second arm 24 and tension means 40 prevent the first arm 22 from pivoting towards the rear of the tractor 2 when the tractor 2 is split.

The first arm 22 includes an elongate member 23 and a substantially planar member 26 extending outwardly from the elongate member 23 such that the planar member 26 is designed for abutting a side of the tractor 2. The planar member 26 includes a plurality of apertures 27 for pivotally coupling to an existing bolt receiver of the tractor 2 by inserting a bolt into the bolt receiver through a selected one of the apertures. The appropriate aperture is selected to maintain the preferred angle between the first arm 22 and the tractor 2. Thus providing multiple apertures 27 permits use of the tractor stand 10 with tractors of various styles having differing heights.

The handle assembly 50 includes a generally rectangular member 52. The threaded bar 44 is fixedly coupled to a first wall 52A of the rectangular member 52. The loop member 64 is coupled to a second wall 52B of the rectangular member 52 such that the loop member 64 has a longitudinal axis substantially aligned with a longitudinal axis of the threaded bar 44.

The handle assembly further includes an elongate handle 54 slidably extending through aligned apertures in the third and fourth walls 52C and 52D of the rectangular member 52 such that the handle 54 protrudes outwardly of opposite sides of the rectangular member 52. The handle includes end portions 54A and 54B larger than the apertures in the third and fourth walls 52C and 52D of the rectangular member 52 such that each end 54A and 54B is prevented from passing entirely through the nearest respective aperture whereby the handle 54 is slidably coupled to the rectangular member 52.

In a most preferred embodiment, each first arm 22 includes a medial aperture 32 for detachably bolting an attachment angle 34 to the first arm 22. The attachment angle 34 has attachment holes 36 on each flange of the angle 34 such that one of the flanges of the angle 34 can be bolted to the first arm 22 using one of the apertures 27. The hole 36 of the free flange of the angle 34 is then positionable for attachment to an oil pan of a frameless tractor.

In use, the stand assemblies are positioned on opposite sides of the tractor. The first arm of either stand assembly is attached to the tractor using a bolt such the first arm extends towards the rear of the tractor. The connecting bar is positioned between the stand assemblies to align the wheels and the other first arm is similarly bolted to the tractor. Each second arm is coupled to a front portion of the tractor using the tension means to increase the tension. The tractor is then splittable. The weight of the tractor naturally drives the wheel backwards but the wheel is held in place by the tension in the second arm and tension means. Thus the weight of the tractor is supported by the tractor stand.

Figure 6:
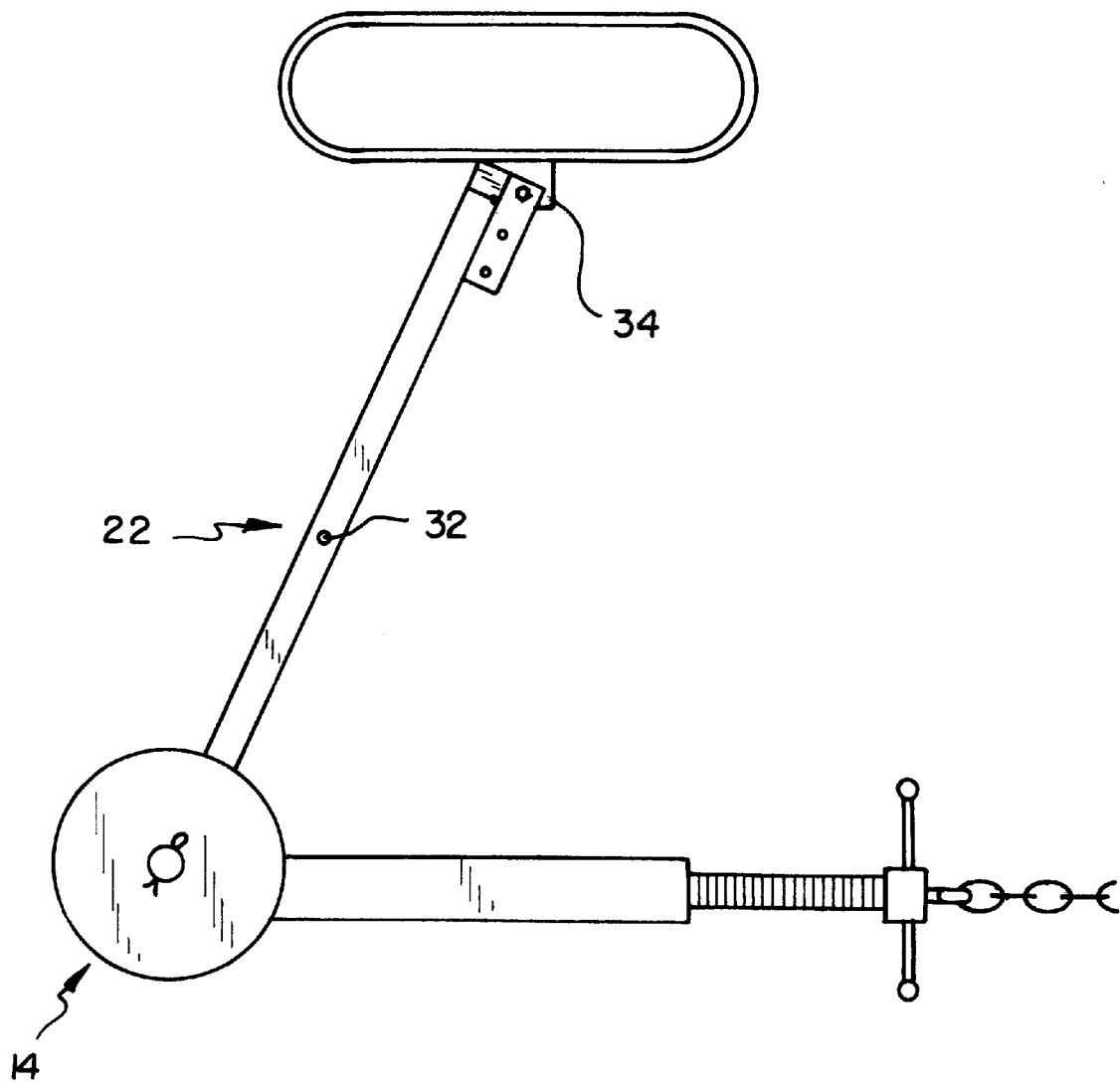
FIG. 6 is a perspective view of the attachment angle used when attaching the present invention to a frameless tractor.

The present invention may also be attached to frameless tractors using the attachment angle for coupling the first arm to the oil pan of the tractor as shown in FIG. 6.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A stand for supporting a front end of a tractor when the tractor is split, the stand comprising:
   a pair of stand assemblies positionable on opposite sides of the tractor;
   wherein each stand assembly comprises:
      a wheel,
      an axle extending from the wheel,
      a first arm pivotally coupled to the axle, the first arm being couplable to the tractor,
      a second arm pivotally coupled to the axle, and
      an adjustable tension means adapted for coupling the second arm to a front portion of the tractor;
   a connecting bar for positioning between the stand assemblies, the axle of each stand assembly being insertable into opposite ends of the connecting bar such that the wheels are substantially aligned.

2. The tractor stand of claim 1, wherein the tension means comprises:
   a threaded collar coupled to a distal end of the second arm,
   a threaded bar, a first end of the threaded bar being extended through the threaded collar such that the threaded bar extends outwardly from the distal end of the second arm;
   a handle assembly fixedly attached to a second end of the threaded bar opposite the first end for rotating the threaded bar such that a distance between the second end of the threaded bar and the collar is adjusted when the threaded bar is rotated;
   a tractor engagement means adapted for coupling to said front portion of the tractor, the tractor engagement means being coupled to the handle assembly.

3. The tractor stand of claim 2 wherein the tractor engagement means is a chain having a first end coupled to a loop member, the loop member being coupled to the handle assembly such that the loop member can rotate freely with respect to the handle assembly such that the chain is not twisted when the handle assembly is rotated;
   the chain having a hook coupled to a second end of the chain, the hook being for engaging a selectable link of the chain such that the chain forms a loop around a front portion of the tractor.

4. The tractor stand of claim 2 wherein the handle assembly includes a generally rectangular member;
   wherein the threaded bar is fixedly coupled to a first wall of the rectangular member; and
   wherein a loop member is coupled to a second wall of the rectangular member such that the loop member has a longitudinal axis substantially aligned with a longitudinal axis of the threaded bar.

5. The tractor stand of claim 4 wherein the handle assembly further comprises:
   an elongate handle slidably extending through aligned apertures in the third and fourth walls of the rectangular member such that the handle protrudes outwardly of opposite sides of the rectangular member; and
   wherein the handle includes end portions larger than the apertures in the third and fourth walls of the rectangular member such that each end of the handle is prevented from passing through the nearest aperture whereby the handle is slidably coupled to the rectangular member.

6. The tractor stand of claim 1, wherein the first arm includes an elongate member and a substantially planar member extending outwardly from a side of a distal end of the elongate member such that the planar member is adapted for abutting a side of the tractor, the planar member having an aperture therethrough such that the planar member is adapted for facilitating coupling of the planar member to an existing bolt receiver of the tractor.

7. The tractor stand of claim 6 wherein the planar member includes a plurality of apertures therethrough, each aperture being adapted for receiving a bolt therethrough whereby a selectable one of the apertures is couplable to an existing bolt receiver of the tractor;
   wherein the apertures are arranged in spaced relationship to each other along a line substantially parallel to a longitudinal axis of the first arm.

8. The tractor stand of claim 1, further comprising:
   an attachment angle structured to have a respective hole on each of a pair of flanges of the attachment angle, the attachment angle being for pivotally coupling to a distal end of the first arm such that the first arm is adaptable for attachment to an oil pan of a frameless tractor; and
   wherein each first arm includes a medial aperture for coupling the attachment angle thereto when the attachment angle is not in use.

9. A tractor stand for supporting a front end of a tractor when the tractor is split, the stand comprising:
   a pair of stand assemblies positionable on opposite sides of the tractor;
   wherein each stand assembly comprises:
      a wheel,
      an axle extending outwardly from a center of the wheel,
      a first arm pivotally coupled to the axle at a first end of the first arm, the first arm being pivotally couplable to the tractor at a second end of the first arm, the first arm having a length such that the first arm extends towards a rear of the tractor at an angle between 10 and 40 degrees when the first arm is coupled to the tractor and the wheel rests on a ground surface,
      a second arm pivotally coupled to the axle at a first end of the second arm, and
      an adjustable tension means adapted for coupling a second end of the second arm to a front portion of the tractor;
   a connecting bar for positioning between the stand assemblies, the axle of each stand assembly being insertable into opposite ends of the connecting bar such that the wheels are substantially aligned;

wherein the tension means comprises:
a threaded collar coupled to the second end of the second arm,
a threaded bar, a first end of the threaded bar being extended through the threaded collar such that the threads of the threaded bar engage the threads of the collar,
a handle assembly for facilitating rotation of the threaded bar, the handle assembly being fixedly attached to a second end of the threaded bar opposite the first end for rotating the threaded bar such that a distance between the second end of the threaded bar and the collar is adjustable by rotating the threaded bar, and
a tractor engagement means adapted for coupling to a front portion of the tractor, the tractor engagement means being coupled the handle assembly;

wherein the tractor engagement means is a chain having a first end coupled to a loop member, the loop member being coupled to the handle assembly such that the loop member can rotate freely with respect to the handle assembly such that the chain is not twisted when the handle assembly is rotated;

the chain having a hook coupled to a second end of the chain, the hook being for engaging a selectable link of the chain such that the chain forms a loop, the loop being adapted for positioning around a front portion of the tractor such that the first arm is prevented from pivoting towards the rear of the tractor when the tractor is split, whereby the weight of the front of the tractor is supported by the stand assembly;

wherein the first arm includes an elongate member and a substantially planar member extending outwardly from a side of the top of the elongate member such that the planar member is adapted for abutting a side of the tractor, the planar member having a plurality of apertures therethrough such that the planar member is adapted for pivotally coupling to an existing bolt receiver of the tractor;

wherein the apertures in the planar member are arranged in spaced relationship to each other along a line substantially parallel to a longitudinal axis of the first arm;

wherein the handle assembly includes a generally rectangular member;

wherein the threaded bar is fixedly coupled to a first wall of the rectangular member; and wherein the loop member is coupled to a second wall of the rectangular member such that the loop member has a longitudinal axis substantially aligned with a longitudinal axis of the threaded bar;

wherein the handle assembly further includes an elongate handle slidably extending through aligned apertures in the third and fourth walls of the rectangular member such that the handle protrudes outwardly of opposite sides of the rectangular member; and wherein the handle includes end portions larger than the apertures in the third and fourth walls of the rectangular member such that each end of the handle is prevented from passing through the nearest aperture whereby the handle is slidably coupled to the rectangular member.

10. A method of splitting a tractor, the steps of the method comprising:
providing a connecting bar and a pair of stand assemblies, wherein each stand assembly includes a wheel, an axle extending outwardly from a center of the wheel, a first arm pivotally coupled to the axle at a first end of the first arm, a second arm pivotally coupled to the axle at a first end of the second arm, and an adjustable tension means adapted for coupling a second end of the second arm to a front portion of the tractor;

coupling one of the first arms of the stand assemblies to a side of the tractor at a second end of the first arm such that the first arm extends towards a rear of the tractor at an angle between 10 and 40 degrees when the first arm is coupled to the tractor and the wheel rests on a around surface;

inserting each axle into opposite ends of the connecting bar such that the wheels are substantially aligned by the connecting bar;

coupling the other of the first arms to an opposite side of the tractor;

coupling each tension means to a front portion of the tractor such that each second arm is coupled to the front portion of the tractor;

adjusting each tension means such that each first arm is prevented from pivoting towards the rear of the tractor; and splitting the tractor.

11. A stand for supporting a front end of a tractor when the tractor is split, the stand comprising:
a pair of stand assemblies positionable on opposite sides of the tractor;
wherein each stand assembly comprises:
a wheel,
an axle extending from the wheel,
a first arm, the first arm being couplable to the tractor,
a second arm, and
a tension means adapted for coupling the second arm to a front portion of the tractor;
a connecting bar for positioning between the stand assemblies, the axle of each stand assembly being couplable to opposite ends of the connecting bar such that the wheels are substantially aligned;
an attachment angle structured to have a respective hole on each of a pair of flanges of the attachment angle, the attachment angle being for pivotally coupling to a distal end of the first arm such that the first arm is adaptable for attachment to an oil pan of a frameless tractor; and
wherein each first arm includes a medial aperture for coupling the attachment angle thereto when the attachment angle is not in use.

12. The tractor stand of claim 11, wherein the tension means comprises:
a threaded collar coupled to a distal end of the second arm;
a threaded bar, a first end of the threaded bar being extended through the threaded collar such that the threaded bar extends outwardly from the distal end of the second arm;
a handle assembly fixedly attached to a second end of the threaded bar opposite the first end for rotating the threaded bar such that a distance between the second end of the threaded bar and the collar is adjusted when the threaded bar is rotated;
a tractor engagement means adapted for coupling to the front portion of the tractor, the tractor engagement means being coupled to the handle assembly.

13. The tractor stand of claim 12 wherein the tractor engagement means is a chain having a first end coupled to a loop member, the loop member being coupled to the handle assembly such that the loop member can rotate freely with respect to the handle assembly such that the chain is not twisted when the handle assembly is rotated;

the chain having a hook coupled to a second end of the chain, the hook being for engaging a selectable link of the chain such that the chain forms a loop around a front portion of the tractor.

14. The tractor stand of claim 12 wherein the handle assembly includes a generally rectangular member;

wherein the threaded bar is fixedly coupled to a first wall of the rectangular member; and wherein a loop member is coupled to a second wall of the rectangular member such that the loop member has a longitudinal axis substantially aligned with a longitudinal axis of the threaded bar.

15. The tractor stand of claim 14 wherein the handle assembly further comprises:

an elongate handle slidably extending through aligned apertures in the third and fourth walls of the rectangular member such that the handle protrudes outwardly of opposite sides of the rectangular member; and wherein the handle includes end portions larger than the apertures in the third and fourth walls of the rectangular member such that each end of the handle is prevented from passing through the nearest aperture whereby the handle is slidably coupled to the rectangular member.

16. The tractor stand of claim 11, wherein the first arm includes an elongate member and a substantially planar member extending outwardly from a side of a distal end of the elongate member such that the planar member is adapted for abutting a side of the tractor, the planar member having an aperture therethrough such that the planar member is adapted for facilitating coupling of the planar member to an existing bolt receiver of the tractor.

17. The tractor stand of claim 16 wherein the planar member includes a plurality of apertures therethrough, each aperture being adapted for receiving a bolt therethrough whereby a selectable one of the apertures is couplable to an existing bolt receiver of the tractor;

wherein the apertures are arranged in spaced relationship to each other along a line substantially parallel to a longitudinal axis of the first arm.

* * * * *